US011529585B2

(12) United States Patent
Kingston et al.

(10) Patent No.: US 11,529,585 B2
(45) Date of Patent: Dec. 20, 2022

(54) THERMAL OXIDATION OF VOLATILE ORGANIC COMPOUNDS USING A CATALYST LAYER WITHIN A WASTE HEAT RECOVERY UNIT

(71) Applicants: Paul William Kingston, Enfield (GB); Olatunde Yusuf, Enfield (GB)

(72) Inventors: Paul William Kingston, Enfield (GB); Olatunde Yusuf, Enfield (GB)

(73) Assignee: KELLOGG BROWN & ROOT LLC, Houston, TX (US)

( * ) Notice: Subject to any disclaimer, the term of this patent is extended or adjusted under 35 U.S.C. 154(b) by 0 days.

(21) Appl. No.: 17/240,748

(22) Filed: Apr. 26, 2021

(65) Prior Publication Data
US 2021/0331117 A1 Oct. 28, 2021

Related U.S. Application Data

(60) Provisional application No. 63/016,126, filed on Apr. 27, 2020.

(51) Int. Cl.
*B01D 53/34* (2006.01)
*B01D 53/86* (2006.01)
(Continued)

(52) U.S. Cl.
CPC ....... *B01D 53/8668* (2013.01); *B01D 53/343* (2013.01); *B01J 8/067* (2013.01);
(Continued)

(58) Field of Classification Search
CPC ............. F28D 7/005; F28D 2021/0026; F28D 2021/0059; B01J 2208/0053; B01J 23/26;
(Continued)

(56) References Cited

U.S. PATENT DOCUMENTS 4,578,112 A 3/1986 Mori et al.
4,875,436 A 10/1989 Smith et al.
(Continued)

FOREIGN PATENT DOCUMENTS

CN 106 369 617 A * 2/2017 ............ F01K 27/00
CN 108343978 A 7/2018
(Continued)

OTHER PUBLICATIONS

International Search Report and Written Opinion dated Sep. 27, 2021 received for International Application No. PCT/US21/29211 filed Apr. 26, 2021 (13 Pages).
(Continued)

*Primary Examiner* — Timothy C Vanoy
(74) *Attorney, Agent, or Firm* — Gary M. Machetta

(57) ABSTRACT

Methods and systems for treating volatile organic compounds (VOCs) generated in a hydrocarbon treating process are disclosed. An effluent stream containing the VOCs, as well as carbon dioxide ($CO_2$) is combined with hot exhaust gas from a turbine and provided to a waste heat recovery unit (WHRU). The WHRU is adapted to contain a catalyst bed containing oxidation catalyst capable of effecting the oxidation of the VOCs. The temperature of the catalyzing reaction can be tailored based on the position of the catalyst bed within the temperature gradient of the WHRU. The methods and systems described herein solve the problem of effecting the removal of VOCs from the effluent. Heating the $CO_2$-containing effluent in the WHRU also lend buoyancy to the effluent, thereby facilitating its dispersal upon release.

20 Claims, 3 Drawing Sheets

(51) Int. Cl.
  *B01J 8/06*    (2006.01)
  *B01J 21/04*   (2006.01)
  *B01J 21/06*   (2006.01)
  *B01J 21/18*   (2006.01)
  *B01J 23/22*   (2006.01)
  *B01J 23/26*   (2006.01)
  *B01J 23/28*   (2006.01)
  *B01J 23/34*   (2006.01)
  *B01J 23/42*   (2006.01)
  *B01J 23/44*   (2006.01)
  *B01J 23/75*   (2006.01)
  *B01J 31/06*   (2006.01)

(52) U.S. Cl.
  CPC ............ *B01J 21/04* (2013.01); *B01J 21/063* (2013.01); *B01J 21/18* (2013.01); *B01J 23/22* (2013.01); *B01J 23/26* (2013.01); *B01J 23/28* (2013.01); *B01J 23/34* (2013.01); *B01J 23/42* (2013.01); *B01J 23/44* (2013.01); *B01J 23/75* (2013.01); *B01J 31/06* (2013.01); *B01D 2255/1021* (2013.01); *B01D 2255/1023* (2013.01); *B01D 2255/2073* (2013.01); *B01D 2255/20723* (2013.01); *B01D 2255/20746* (2013.01); *B01D 2255/20769* (2013.01); *B01D 2255/20784* (2013.01); *B01D 2257/708* (2013.01); *B01D 2257/7027* (2013.01)

(58) Field of Classification Search
  CPC ..... B01J 21/04; B01J 8/06; B01J 23/44; B01J 23/28; B01J 21/18; B01J 23/34; B01J 23/22; B01J 8/0285; B01J 23/75; B01J 2208/00194; B01J 23/42; B01J 2208/00061; B01J 31/06; B01J 21/063; B01D 2255/20769; B01D 2255/1021; B01D 2255/1023; B01D 2257/708; B01D 2255/20784; B01D 2255/2073; B01D 2256/22; B01D 2257/7027; B01D 53/343; B01D 53/8668; B01D 2255/20723; B01D 2255/20746; Y02A 50/20
  See application file for complete search history.

(56) References Cited

U.S. PATENT DOCUMENTS

| | | |
|---|---|---|
| 5,589,142 A | 12/1996 | Gribbon |
| 8,646,289 B1 | 2/2014 | Shivers, III et al. |
| 2002/0108895 A1 | 8/2002 | Kerfoot |
| 2010/0215558 A1 | 8/2010 | Kraemer |

FOREIGN PATENT DOCUMENTS

| | | | | |
|---|---|---|---|---|
| CN | 111 836 997 A | * | 10/2020 | ............... F01N 1/14 |
| WO | WO 2008 031 147 A1 | * | 3/2008 | ................ F17C 5/02 |
| WO | WO 2014 129402 A1 | * | 8/2014 | ......... B01D 53/1475 |

OTHER PUBLICATIONS

Hindawi Publishing Corporation, Journal of Chemistry; "Recent Development of Catalysts for Removal of Volatile Organic Compounds in Flue Gas by Combustion: A Review"; Received Nov. 6, 2015; Accepted Feb. 28, 2016; 16 pages.

* cited by examiner

THERMAL OXIDATION OF VOLATILE ORGANIC COMPOUNDS USING A CATALYST LAYER WITHIN A WASTE HEAT RECOVERY UNIT

CROSS REFERENCE TO RELATED APPLICATIONS

The present application claims priority to U.S. Provisional Patent Application Ser. No. 63/016,126, filed Apr. 27, 2020, the contents of which are incorporated herein by reference.

FIELD OF THE INVENTION

This application relates to hydrocarbon processing, and more particularly to equipment and processes for removing volatile organic compounds (VOCs) from carbon dioxide gas streams.

INTRODUCTION

Processing facilities for oil and gas often generate one or more effluent gas streams that contain volatile organic compounds (VOCs). Examples of such compounds include aromatic compounds, such as benzene, toluene, ethylbenzene, and xylene, a combination referred to as BTEX. Because of environmental concerns, such VOCs must typically be abated prior to releasing the gas streams into the atmosphere. Abatement technologies typically involve oxidizing the VOCs at an elevated temperature. Such abatement technologies require dedicated facilities to heat the effluent gas stream(s), to supply oxygen for the oxidation reactions, and to cool the treated streams. Thus, such abatement technologies add to the energy demand and space demand for the facilities.

Another problem encountered in some processing facilities is that some effluent gasses that are released into the atmosphere lack sufficient buoyancy to disperse, and therefore slump back down and bathe the facilities and immediate surrounding areas with the effluent gas. For example, one of the effluent gas streams from an acid gas removal process comprises carbon dioxide ($CO_2$) (and possibly small amounts of VOCs and/or hydrogen sulfide ($H_2S$)), which are ultimately released to the atmosphere. If the released gas stream is at ambient temperature, or only slightly above ambient temperature, the gas will not adequately disperse.

Thus, there is a need in the art for solutions to these two problems, (1) new abatement processes for VOCs in effluent gas streams, and (2) techniques for increasing the buoyancy of effluent gas streams to facilitate dispersal.

SUMMARY

Disclosed herein is a method of treating a first gas stream, wherein the first gas stream comprises carbon dioxide ($CO_2$) and at least one volatile organic compound (VOC), the method comprising: mixing the first gas stream and a turbine exhaust gas within a waste heat recovery unit (WHRU) to generate a second gas stream, wherein the WHRU comprises at least one bank of heat exchange tubes and a catalyst bed comprising an oxidation catalyst, allowing the at second gas stream to contact the catalyst bed within the WHRU, thereby effecting oxidation of the at least one VOC in the second gas stream, and releasing the second gas stream from the WHRU. According to some embodiments, mixing the first gas stream and the turbine exhaust gas comprises adding the first gas stream to the hot turbine exhaust gas before the WHRU. According to some embodiments, mixing the first gas stream and the turbine exhaust gas comprises providing the first gas stream and the turbine exhaust gas separately to the WHRU. According to some embodiments, the at least one VOC comprises one or more of benzene, toluene, ethylbenzene, and xylene. According to some embodiments, the first gas stream is an effluent gas from an acid gas removal process. According to some embodiments, the acid gas removal process is a process within a floating storage, production, and offloading facility (FPSO) or within a floating liquified natural gas (FLNG) facility. According to some embodiments, the second gas stream is released from the WHRU at a temperature of greater than 150° C. According to some embodiments, the second gas stream is released from the WHRU at a temperature of greater than 190° C. According to some embodiments, the oxidation catalyst comprises one or more metals selected from the group consisting of palladium, platinum, vanadium, chromium, manganese, molybdenum, and cobalt. According to some embodiments, the oxidation catalyst comprises one or more metals deposited on a support material selected from the group consisting of titania, zeolite, alumina, activated carbon, and styrene divinylbenzene copolymer (SDB).

Also disclosed herein is a hydrocarbon processing system comprising: at least one processing unit that generates an effluent gas stream that comprises carbon dioxide ($CO_2$) and at least one volatile organic compounds (VOC), at least one gas turbine that generates hot exhaust gas, and a waste heat recovery unit (WHRU) comprising at least one bank of heat exchange tubes and a catalyst bed comprising an oxidation catalyst, wherein the effluent gas stream and the hot exhaust gas are both provided to the WHRU, such that the oxidation catalyst effects oxidation of the at least one VOC. According to some embodiments, mixing the effluent gas stream is mixed with the hot exhaust gas to provide a combined gas stream, which is provided to the WHRU. According to some embodiments, the effluent gas stream and the hot turbine exhaust gas are provided separately to the WHRU. According to some embodiments, the at least one VOC comprises one or more of benzene, toluene, ethylbenzene, and xylene. According to some embodiments, the at least one processing unit comprises an acid gas removal unit. According to some embodiments, the acid gas removal unit is a component of a floating storage, production, and offloading facility (FPSO) or within a floating liquified natural gas (FLNG) facility. According to some embodiments, effluent from the WHRU is released at a temperature of greater than 150° C. According to some embodiments, effluent from the WHRU is released at a temperature of greater than 190° C. According to some embodiments, the oxidation catalyst comprises one or more metals selected from the group consisting of palladium, platinum, vanadium, chromium, manganese, molybdenum, and cobalt. According to some embodiments, the oxidation catalyst comprises one or more metals deposited on a support material selected from the group consisting of titania, zeolite, alumina, activated carbon, and styrene divinylbenzene copolymer (SDB).

DETAILED DESCRIPTION

Figure 1:
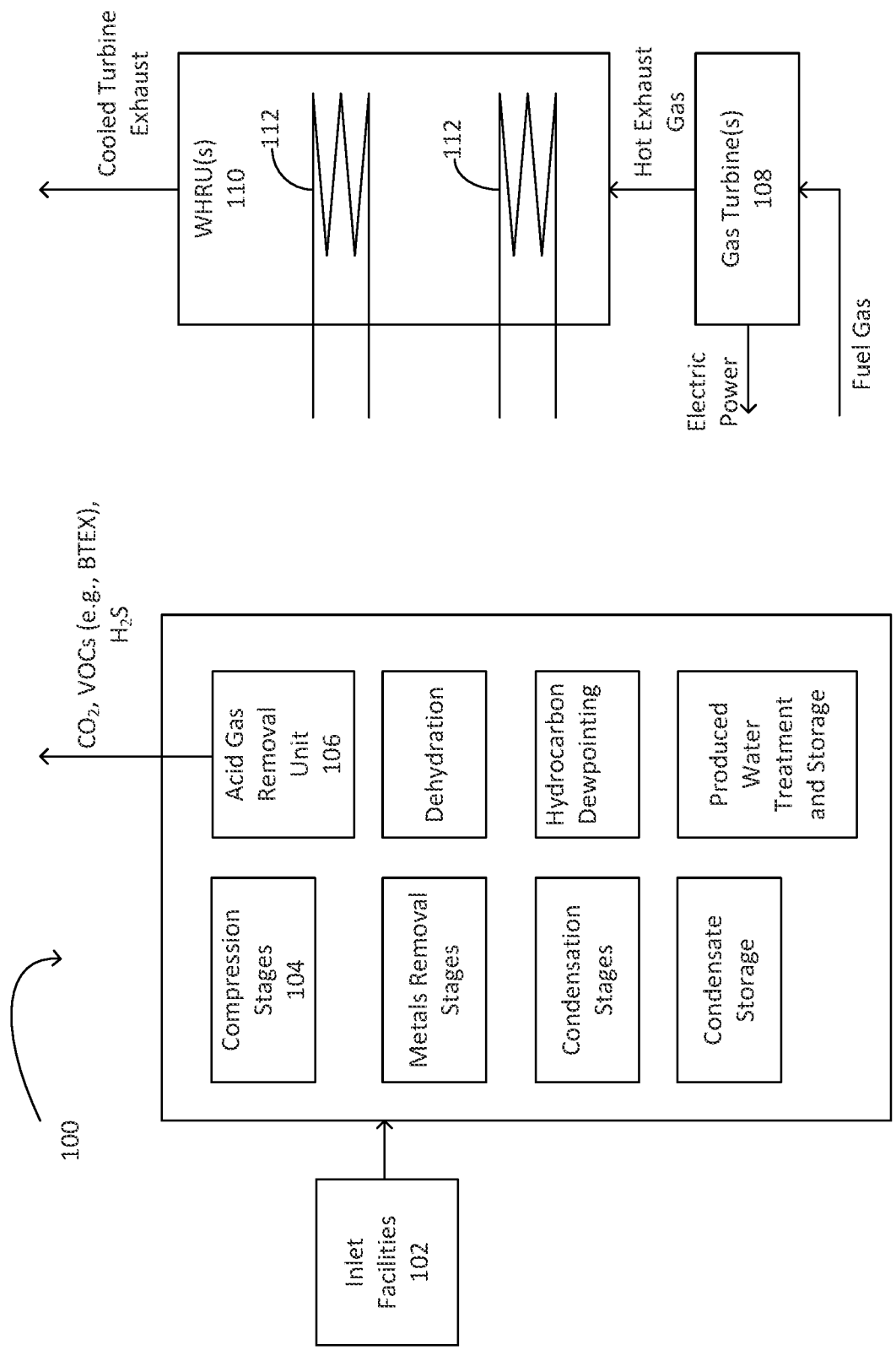
FIG. 1 shows a high-level schematic of selected components of a hydrocarbon processing facility.

FIG. 1 illustrates a genericized diagram of a hydrocarbon processing facility 100. The processing facility may be a floating storage and production offloading (FPSO) facility, a floating liquified natural gas (FLNG) operation, or a land-based operation, for example. The general operation and components of such facilities are understood by those of skill in the art and most of the specifics are not relevant to this disclosure so are not discussed in detail. Such hydrocarbon processing facilities 100 typically include inlet facilities 102 and multiple compression stages 104. Examples of such compression stages in the context of an FPSO include depletion compression and export compression. An FLNG operation would include a process for liquefaction, storage, and offloading of product. It should be appreciated that various types and embodiments of hydrocarbon processing facilities may include more or fewer stages and equipment than illustrated in FIG. 1.

The hydrocarbon processing facility 100 includes an acid gas removal unit (AGRU) 106, which is configured to remove carbon dioxide ($CO_2$) and hydrogen sulfide ($H_2S$) (collectively referred to as acid gas) from gasses processed in the facility. Typical AGRUs use a regenerative amine scrubbing technology to absorb those components from the process gas. The absorbed acid gas is then stripped from amine. The acid gas may be treated by various processes, such as sulfur recovery/abatement and/or may be reinjected into a suitable underground zone. Acid gas treatment often results in the production of a wet effluent stream containing $CO_2$ and possibly small amounts of VOCs and/or $H_2S$ that is ultimately released into the atmosphere. This disclosure provides methods and systems for treating such an effluent stream that overcomes the problems discussed above in the Introduction. It should be appreciated that, while the methods and systems described herein are discussed in the context of treating an effluent stream from an AGRU, the disclosed methods and systems are generally applicable to treating any effluent stream of $CO_2$ that may contain VOCs (such as BTEX). For example, the disclosed techniques may be used to treat a gas stream that comprises up to about 99 mol % $CO_2$ and BTEX from trace amounts up to about 0.3 mol % (including compounds such as Methane, Ethane, Propane, i-Butane, n-Butane, i-Pentane, n-Pentane, Benzene, Toluene, E-Benzene, p-Xylene and n-Propylbenzene). Note that this composition is only one example.

The illustrated hydrocarbon treating facility 100 also includes one or more gas turbines 108 configured to power electric generators and/or compressors for the facility. The gas turbine(s) 108 burn gas (e.g., natural gas produced by the facility) to generate the electric power. The gas turbine(s) 108 also produce hot exhaust gas. The turbine exhaust gas comprises nitrogen (typically ~66-72%), oxygen (typically ~12-18%), $CO_2$ (typically ~1-5%), water vapor (typically ~1-5%), and small amounts of components such as oxides of nitrogen, unburned fuel, and the like.

The hot turbine exhaust gas is provided to a waste heat recovery unit (WHRU) 110, which cools the exhaust gas. The WHRU 110 comprises one or more banks of heat exchange tubes 112, which contain a fluid, such as water, oil, or steam, and which cool the hot turbine exhaust gas via heat exchange. The heated fluid from the WHRU 110 can be used to do further work within the facility, such as powering steam turbines, heating kettles, etc.

Referring again to the AGRU 106 of FIG. 1, notice that the effluent gas stream comprises wet $CO_2$, VOCs (such as BTEX), and potentially traces of $H_2S$. This effluent gas stream may cause problems, as discussed in the Introduction. The first problem is referred to herein as a buoyancy problem. Typically, a $CO_2$ effluent gas requires a temperature above about 140-150° C. to be positively buoyant. But the effluent gas stream from an AGRU (such as 106) typically has a temperature that is only slightly higher than ambient temperature, so the effluent gas stream typically lacks the buoyancy required to easily disperse in the atmosphere outside the immediate vicinity of the facilities. As a result, the facilities and surrounding areas become bathed in the effluent gasses.

The second problem is referred to herein as the VOC problem, namely, that the AGRU effluent gas stream may contain VOCs (such as BTEX) that need to be destroyed prior to releasing the effluent gas to the atmosphere. Current commercially available methods of removing/destroying such VOCs, such as regenerative thermal oxidizers (RTO), direct fired thermal oxidizers (DFTO), recuperative catalytic thermal oxidizers (RCO), and the like, require equipment, such as a burner to provide heat to initiate or sustain an oxidation reaction. Since the total effluent stream must be heated, this is an energy intensive process. Also, RTO is a batch process with switching beds containing thermal mass and requires a high number of switching operations and potential variations in VOC concentration can cause significant operational issues.

Figure 2:
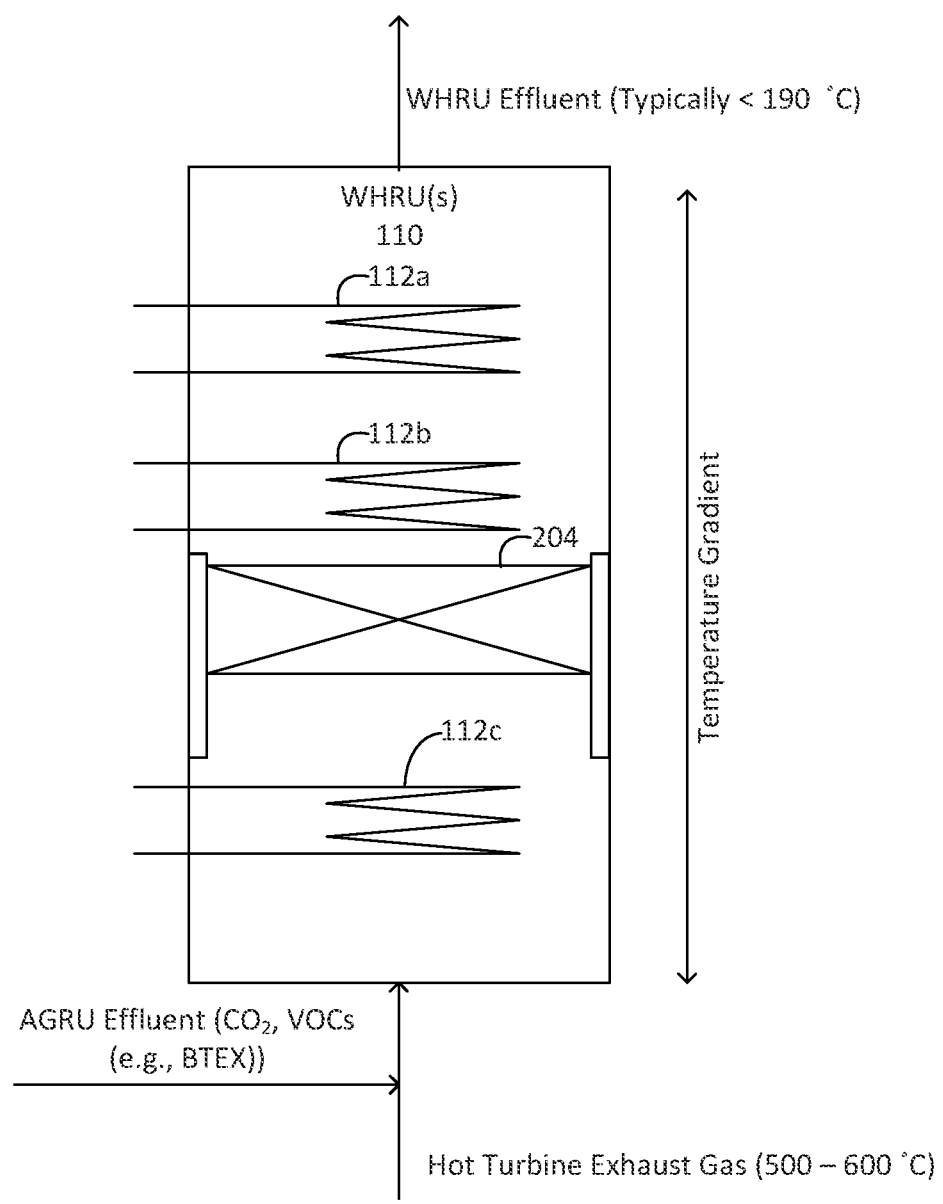
FIG. 2 shows an improved waste heat recovery unit (WHRU).

The inventors have found that both the buoyancy problem and the VOC problem can be solved by using a modified WHRU 202 as illustrated in FIG. 2. The illustrated modified WHRU 202 includes one or more oxidative catalytic beds 204 disposed amongst the banks of tubes 112 (e.g., 112a, 112b, and 112c). In embodiments of the disclosed methods and systems, the AGRU effluent stream, which includes $CO_2$ and VOCs, can be combined with the hot turbine exhaust gas and fed to the modified WHRU 202.

It is within the ability of a person of skill in the art to determine how to combine the AGRU effluent stream with the hot turbine exhaust gas and feed the combined stream into the WHRU. The specifics will depend on the operational configuration. Where the flowrates and pressure drops allow, the streams may typically be combined by a simple duct or pipework Tee with or without multi-louvre dampers to provide flow control. If the AGRU stream pressure is particularly low, i.e. close to atmospheric pressure, then a bespoke eductor or mixing device may be required, as will appreciated by a skilled engineer.

Figure 3:
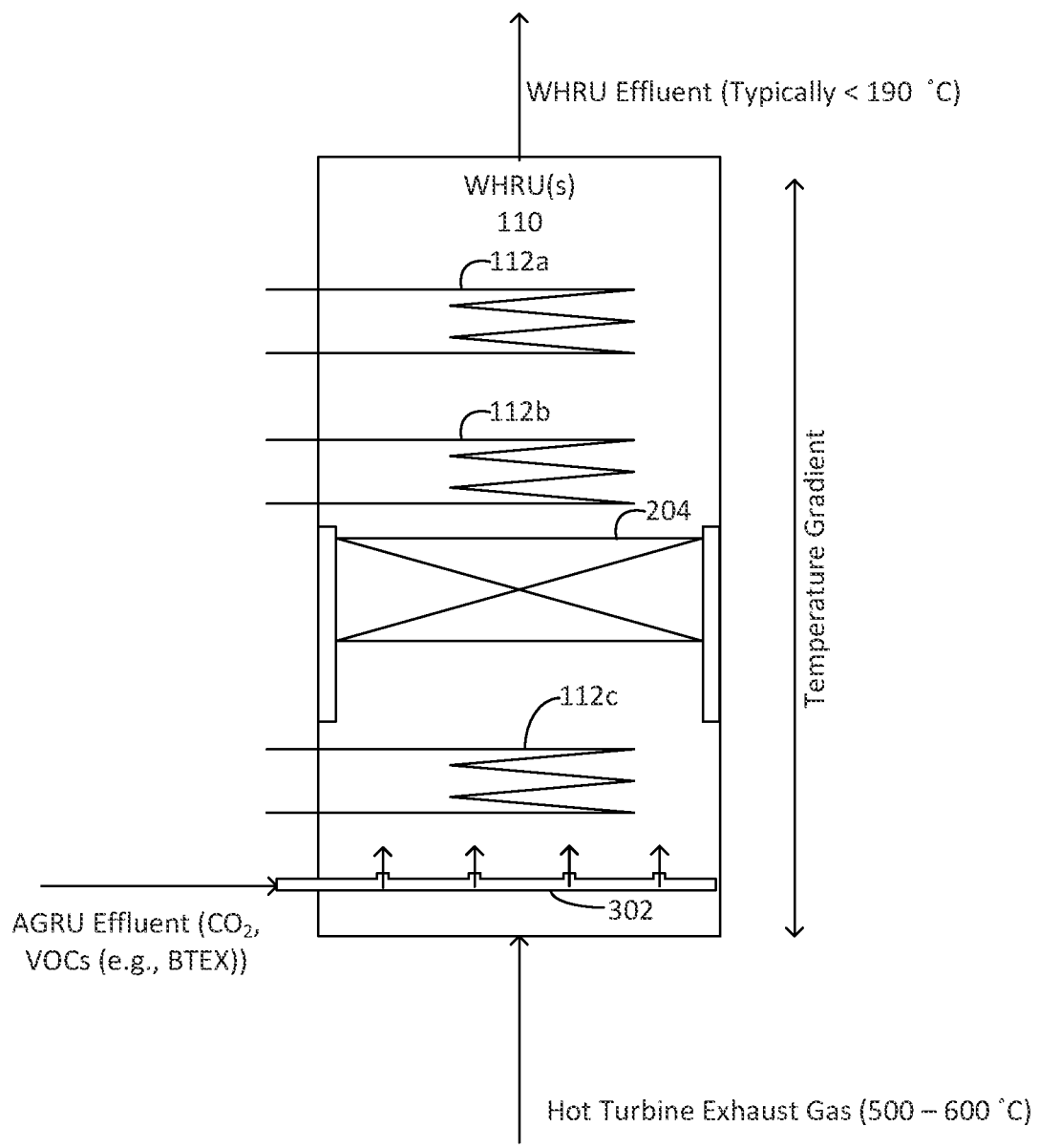
FIG. 3 shows an alternative embodiment of an improved waste heat recovery unit (WHRU).

In the embodiment illustrated in FIG. 2, the AGRU effluent stream is mixed with the hot turbine exhaust gas prior to feeding the combined streams into the WHRU. FIG. 3 shows an alternative embodiment, wherein the AGRU effluent stream is mixed with the hot turbine exhaust gas within the WHRU. In the illustrated embodiment, the WHRU comprises a grid 302 through which the AGRU effluent stream is introduced into the exhaust gas stream.

Combining the AGRU effluent with the hot turbine exhaust gas solves the buoyancy problem because the ARGU effluent is heated to a temperature that provides adequate buoyancy for safe dispersal into the atmosphere. Typically, the hot turbine exhaust gas is at a temperature of about 500-600° C. when it enters the WHRU and is ultimately cooled to a temperature of about 200-300° C. before exiting the WHRU. The AGRU effluent gases are heated via heat exchange with the hot turbine exhaust gas within the WHRU and thereby exit the WHRU with sufficient buoyancy for dispersal.

Furthermore, the modified WHRU 202 is ideally configured for the oxidative destruction of VOCs within the AGRU effluent gas. The oxidative catalytic bed 204 can be positioned within the WHRU at a location having a temperature appropriate for the catalytic oxidation reactions. For example, the illustrated WHRU 110 comprises three banks of tubes—112a, 112b, and 112c. It should be noted that the illustrated embodiment, including three banks of tubes, is for illustration purposes only. Many WHRUs contain only one bank. In such cases, the split can be made at any position. Depending on the optimum operating temperature of the oxidation catalyst, the oxidative catalytic bed 204 may be positioned between banks 112a and 112b, or between banks 112b and 112c. It is within the ability of a person of skill in the art of WHRU design to determine the location within the WHRU that provides the specified temperature. Moreover, the circulation parameters of the fluid within the tubes may be controlled to adjust the temperature at a particular location. Thus, the catalytic bed can be heated without the need of providing extraneous heat sources, as would be required for the other methods of VOC abatement discussed above, such as RCO. The thickness of the bed can be calculated to provide the requisite contact time of the effluent gas stream with the catalyst.

The oxidative catalytic bed 204 can generally comprise any catalytic system that is capable of oxidizing the VOCs (such as BTEX) present in the AGRU effluent. For example, the catalyst composition may be based on noble metal active phases, such as palladium and/or platinum or may be based on non-noble metals, such as vanadium, chromium, manganese, molybdenum, cobalt, etc. The catalytically active metal(s)/metal complexes may be deposited on support materials, such as titania, zeolite, alumina, activated carbon, styrene divinylbenzene copolymer (SDB) or the like. Depending on the particular catalyst, the prescribed temperature may be about 180-500° C. As mentioned above, the catalyst bed can be positioned within the WHRU to obtain the correct temperature. An advantage of the disclosed system is that the heat needed to provide the prescribed temperature is present in the system already and no additional heating facilities are required. Because the hot turbine exhaust gas typically has a temperature of about 500-600° C., there is plenty of heat available. Thus, in some embodiments is possible to run the oxidation at higher temperatures for better conversion efficiency, without investing in extraneous heating facilities.

According to some embodiments, hydrogen sulfide ($H_2S$) may be present in the AGRU effluent stream, which may poison the catalyst over time. In such situations, the oxidative catalyst bed 204 may be located within the WHRU at a position with an elevated temperature at which the catalyst is continuously regenerated. Again, the prescribed temperatures for regeneration are catalyst-specific and may be provided by the catalyst supplier, for example.

It should be mentioned that WHRUs including a catalytic stage for catalytically destroying oxides of nitrogen (NOx) present in the turbine exhaust gas are known in the art. An example of such a WHRU is described in U.S. Pat. No. 4,875,436. In such systems and processes (known as selective catalytic reduction (SCR)), a gaseous reductant, typically anhydrous ammonia, aqueous ammonia, or urea is added to the turbine exhaust gas and is absorbed onto a reductive catalyst within the WHRU. The catalyst promotes the overall reaction of reducing the NOx compounds to nitrogen ($N_2$).

The systems and process described in this disclosure differ from the prior art SCR processes in several ways. First, the disclosed systems and processes are directed to abatement of VOCs originating from a source other than the turbine (i.e., a secondary source). For example, the instantly disclosed systems and processes can be used to oxidize VOCs produced in an AGRU. Moreover, as mentioned above, the instantly disclosed systems and processes provide added buoyancy to the $CO_2$ produced by the secondary source. In contrast, the prior art SCR systems are aimed only at reducing NOx present in the turbine exhaust. Another difference is that the prior art SCR systems require the addition of one or more components (e.g., a reductant gas such as $NH_3$) whose sole purpose is to facilitate the catalytic reactions. In contrast, the instantly disclosed systems and processes do not require additional reactants. The stream to be treated (i.e., the wet $CO_2$ stream, such as the AGRU effluent) is simply mixed with the hot turbine exhaust, and those two streams contain all of the reactants necessary for the catalytic oxidation of the VOCs. Thus, the disclosed systems and processes provide an elegant solution for treating a process stream with very little modification to equipment that is already present in the facilities.

The inventor has recognized other benefits to the disclosed methods and systems compared to prior art solutions. For example, systems that use an RTO may suffer in instances when the VOC content of the $CO_2$ varies, such as during start-up or during a process upset. This is problematic, especially when increases in the VOC content approaches or exceeds the lower explosive limit. Such variations may result in a significant increase in temperature, leading to process control issues, and possibly to a trip and/or a deflagration invent. In the disclosed methods and systems, mixing the wet $CO_2$ stream with a much larger turbine exhaust stream prior to oxidation results in a proportional dilution, which inherently limits these adverse potentials.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A method of treating a first gas stream, wherein the first gas stream comprises carbon dioxide ($CO_2$) and at least one volatile organic compound (VOC), the method comprising:
   providing the first gas stream and a turbine exhaust gas to a waste heat recovery unit (WHRU) to generate a second gas stream, wherein the WHRU comprises at least one bank of heat exchange tubes and a catalyst bed comprising an oxidation catalyst,
   allowing the second gas stream to contact the catalyst bed within the WHRU, thereby effecting oxidation of the at least one VOC, and
   releasing the second gas stream from the WHRU.

2. The method of claim 1, wherein providing the first gas stream and the turbine exhaust gas to the WHRU comprises adding the first gas stream to the turbine exhaust gas before the two gasses enter the WHRU.

3. The method of claim 1, wherein providing the first gas stream and the turbine exhaust gas comprises providing the first gas stream and the turbine exhaust gas separately to the WHRU.

4. The method of claim 1, wherein the at least one VOC comprises one or more of benzene, toluene, ethylbenzene, and xylene.

5. The method of claim 1, wherein the first gas stream is an effluent gas from an acid gas removal process.

6. The method of claim 5, wherein the acid gas removal process is a process within a floating storage, production, and offloading facility (FPSO) or within a floating liquified natural gas (FLNG) facility.

7. The method of claim 1, wherein the second gas stream is released from the WHRU at a temperature of greater than 150° C.

8. The method of claim 1, wherein the second gas stream is released from the WHRU at a temperature of greater than 190° C.

9. The method of claim 1, wherein the oxidation catalyst comprises one or more metals selected from the group consisting of palladium, platinum, vanadium, chromium, manganese, molybdenum, and cobalt.

10. The method of claim 1, wherein the oxidation catalyst comprises one or more metals deposited on a support material selected from the group consisting of titania, zeolite, alumina, activated carbon, and styrene divinylbenzene copolymer (SDB).

11. A hydrocarbon processing system comprising:
at least one process that generates an effluent gas stream that comprises carbon dioxide ($CO_2$) and at least one volatile organic compounds (VOC),
at least one gas turbine that generates exhaust gas, and
a waste heat recovery unit (WHRU) comprising at least one bank of heat exchange tubes and a catalyst bed comprising an oxidation catalyst, wherein
the effluent gas stream and the exhaust gas are both provided to the WHRU, such that the oxidation catalyst effects oxidation of the at least one VOC.

12. The system of claim 11, wherein the effluent gas stream is mixed with the exhaust gas to provide a combined gas stream, which is provided to the WHRU.

13. The system of claim 11, wherein the effluent gas stream and the turbine exhaust gas are provided separately to the WHRU.

14. The system of claim 11, wherein the at least one VOC comprises one or more of benzene, toluene, ethylbenzene, and xylene.

15. The system of claim 11, wherein the at least one process comprises acid gas removal.

16. The system of claim 15, wherein the acid gas removal is a component of a floating storage, production, an offloading facility (FPSO), or a floating liquified natural gas (FLNG) facility.

17. The system of claim 11, wherein effluent from the WHRU is released at a temperature of greater than 150° C.

18. The system of claim 11, wherein effluent from the WHRU is released at a temperature of greater than 190° C.

19. The system of claim 11, wherein the oxidation catalyst comprises one or more metals selected from the group consisting of palladium, platinum, vanadium, chromium, manganese, molybdenum, and cobalt.

20. The system of claim 11, wherein the oxidation catalyst comprises one or more metals deposited on a support material selected from the group consisting of titania, zeolite, alumina, activated carbon, and styrene divinylbenzene copolymer (SDB).

* * * * *